United States Patent
Curtis et al.

(10) Patent No.: US 12,522,349 B2
(45) Date of Patent: Jan. 13, 2026

(54) MONITORING ACTUATOR SYSTEM HEALTH

(71) Applicant: Eaton Intelligent Power Limited, Dublin (IE)

(72) Inventors: Tyler Quincey Curtis, Rockford, MI (US); Andrew Murrell, Cucamonga, CA (US)

(73) Assignee: Eaton Intelligent Power Limited, Dublin (IE)

( * ) Notice: Subject to any disclaimer, the term of this patent is extended or adjusted under 35 U.S.C. 154(b) by 348 days.

(21) Appl. No.: 17/784,744

(22) PCT Filed: Dec. 11, 2020

(86) PCT No.: PCT/EP2020/025575
§ 371 (c)(1),
(2) Date: Jun. 13, 2022

(87) PCT Pub. No.: WO2021/115635
PCT Pub. Date: Jun. 17, 2021

(65) Prior Publication Data
US 2023/0002035 A1    Jan. 5, 2023

Related U.S. Application Data

(60) Provisional application No. 62/947,835, filed on Dec. 13, 2019.

(51) Int. Cl.
*B64C 13/50* (2006.01)
*G05B 23/02* (2006.01)
(Continued)

(52) U.S. Cl.
CPC ........ *B64C 13/505* (2018.01); *G05B 23/0235* (2013.01); *G07C 5/0808* (2013.01); *B64D 2045/0085* (2013.01)

(58) Field of Classification Search
CPC .............. G05B 23/0235; G07C 5/0808; B64C 13/505; B64D 2045/0085
See application file for complete search history.

(56) References Cited

U.S. PATENT DOCUMENTS

| 7,100,870 B2 * | 9/2006 | Flatt | H02K 7/116 244/99.2 |
| 9,766,619 B2 * | 9/2017 | Ziarno | H04B 7/18506 |

(Continued)

FOREIGN PATENT DOCUMENTS

| EP | 2 038 713 A2 | 3/2009 |
| WO | 2008080400 | 7/2008 |
| WO | 2015/153845 A1 | 10/2015 |

OTHER PUBLICATIONS

International Search Report and Written Opinion of the International Searching Authority for International Patent Application No. PCT/EP2020/025575 mailed Apr. 8, 2021, 14 pages.

(Continued)

*Primary Examiner* — Elias Desta
(74) *Attorney, Agent, or Firm* — Merchant & Gould P.C.

(57) ABSTRACT

An overall efficiency of an actuator system can be monitored to determine the health of the actuator system. A ratio between the output power of the actuator system and the input power of the actuator system is monitored over time. Degradation of the efficiency of the actuator system may be observed and corrective action taken before failure of the actuator system.

20 Claims, 2 Drawing Sheets

(51) Int. Cl.
*G07C 5/08* (2006.01)
*B64D 45/00* (2006.01)

(56) References Cited

U.S. PATENT DOCUMENTS

| | | |
|---|---|---|
| 10,234,012 B1 | 3/2019 | Latif |
| 2005/0192727 A1* | 9/2005 | Shostak .................. B60J 10/00 |
| | | 701/1 |
| 2007/0198225 A1 | 8/2007 | Roach et al. |
| 2010/0250047 A1 | 9/2010 | Balasu et al. |

OTHER PUBLICATIONS

"Measure While You Press: Force Feedback in Linear Actuators", EDrive® Actuators, 4 pages (2019).
European Communication pursuant to Article 94-3 EPC for EP Application No. 208339.225.8 mailed Dec. 10, 2024, 11 pages.
European Communication pursuant to Article 94-3 EPC for EP Application No. 20839225.8 mailed Dec. 10, 2024, 11 pages.

* cited by examiner

MONITORING ACTUATOR SYSTEM HEALTH

CROSS-REFERENCE TO RELATED APPLICATION

This application is a National Stage Application of PCT/EP2020/025575, filed on Dec. 11, 2020, which claims the benefit of U.S. Patent Application Ser. No. 62/947,835, filed on Dec. 13, 2019, the disclosures of which are incorporated herein by reference in their entireties. To the extent appropriate, a claim of priority is made to each of the above disclosed applications.

TECHNICAL FIELD

The present disclosure relates generally to actuator systems. More particularly, the present disclosure relates to redundant actuator systems used for flight control components in aviation.

BACKGROUND

Primary flight control components are used to control the lift and direction of an aircraft while secondary flight control components are used to improve performance characteristics of the aircraft. Actuator systems can be used to supply mechanical power necessary to move one or more of the primary and/or the secondary flight control components in an aircraft. For example, each actuator system may move a flight control component relative to a support surface of the aircraft. Example actuator systems include an actuator, a motor, and optionally a gear box. The actuator system receives an input power at the motor, transfer the power along an actuator transmission path, and generates an output power using the actuator.

Inefficiencies within the actuator transmission path cause an overall loss between the input power delivered to the motor and output mechanical power transmitted by the actuator. The efficiency may change throughout the life of the actuator as normal operation changes interfaces within the component parts. The overall change in efficiency of the actuator transmission path may be caused by variable efficiencies within the motor, gear train, screw drive or other actuator, or other factors. Decreased efficiency can lead to reduced performance or even loss of functionality of the flight control component while increases in efficiency can generate excessive output forces.

In certain systems, redundancy is provided by including a primary actuator system and a secondary actuator system for one or more of the flight components. Each actuator system includes a respective actuator (e.g., an electromechanical actuator), motor, and optionally a gear box. The secondary actuator system takes over upon failure of the primary actuator system. Upon landing, the primary actuator system is then serviced, which may include replacing a faulty actuator or other component.

When designing flight control component systems, it may be necessary to determine theoretical lowest and highest efficiency values of the actuator system. Aircraft regulations may require components to be designed to withstand a maximum operating load applied by the actuator system when the system is running at peak efficiency and the input power to the actuator system is set at a predetermined maximum amount. This represents a maximum output power that could be applied by the actuator system. Designing flight control components to withstand the maximum output power requires the components to be overbuilt for standard operating conditions, resulting in heavier and more expensive components and corresponding supports then typically necessary during operation.

SUMMARY

Aspects of the disclosure relate to actuator systems and methods that provide for real-time health and performance monitoring. In certain implementations, the health and performance of an actuator system can be determined based on an overall efficiency value of the actuator determined by using force data generated by a force sensor. In certain examples, the force sensor is integrated along a transmission path of the actuator system. In certain examples, the system generates an alert (e.g., a replacement alert) if the overall efficiency value deviates from a reference efficiency value by a predetermined amount. In certain examples, the alert occurs prior to failure of the actuator system.

Another aspect of the present disclosure relates to an actuator system including an electric motor coupled to an actuator with an integrated force sensor. The force sensor is configured to sense the force generated by the actuator. The force sensor is connected to a controller, which controls operation of the electric motor to ensure that the force applied by the actuator is within nominal conditions. The controller also interfaces with the force sensor and is configured to use force data from the force sensor to determine an overall efficiency value for the actuator system.

DETAILED DESCRIPTION

Figure 1:
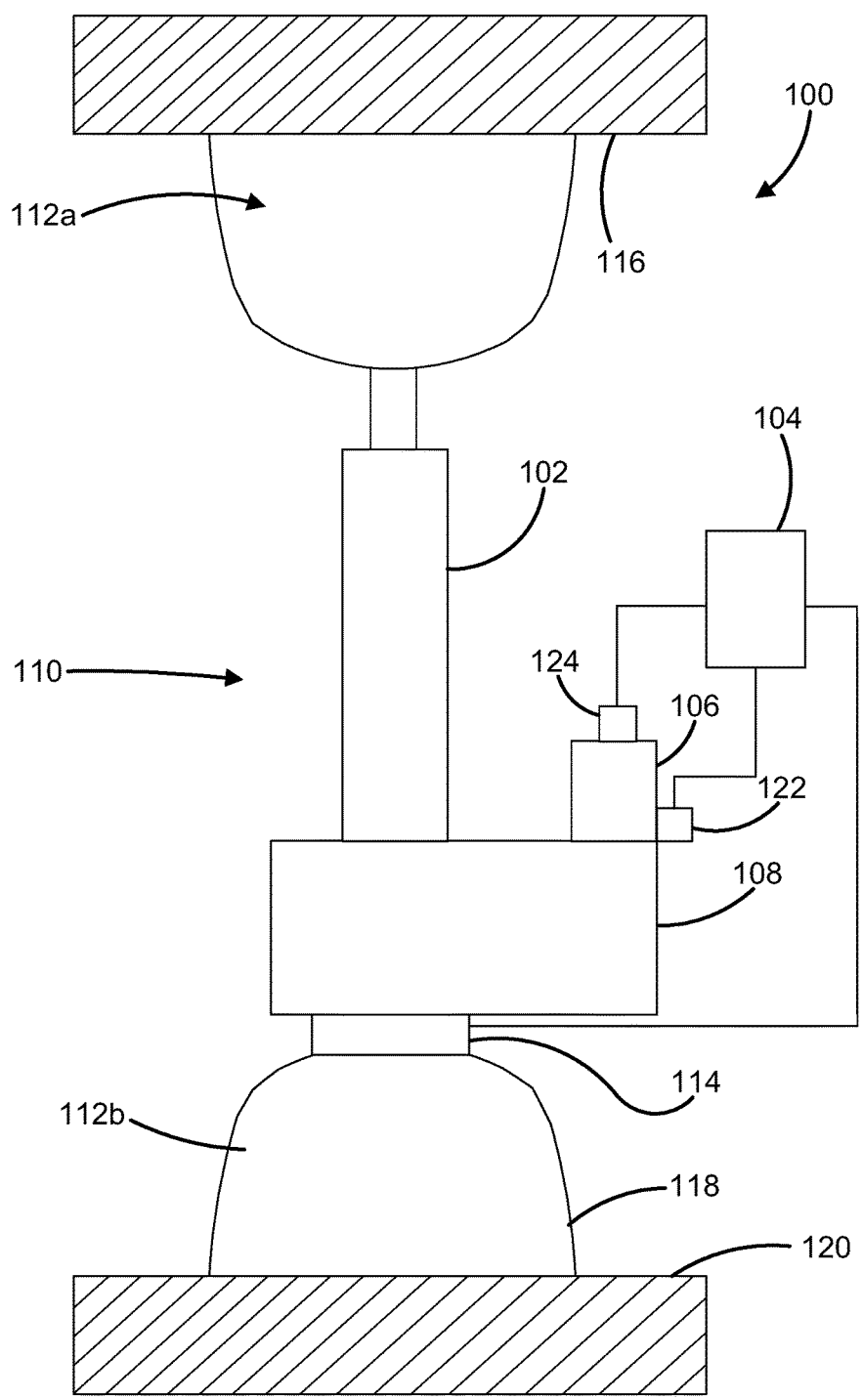
FIG. 1 is a schematic diagram of an example linear actuator system in accordance with the principles of the present disclosure.

Referring to the figures in general, an actuator system 100, 200 includes an actuator 110, 210 coupled to an electric motor 106, 206. The actuator 110, 210 is connected by connection members 112*a*, 212*a* to a flight control component 116, 216 and by connection members 112*b*, 212*b* to an aircraft support surface 120, 220. The actuator 110, 210 applies a force to the flight control component 116, 216 to move the flight control component 116, 216 relative to the aircraft support surface 120, 220. In some examples, the actuator 110 includes a linear actuator that translates the flight control component 116 relative to the aircraft support surface 120 (e.g., see FIG. 1). In other examples, the actuator 210 includes a rotary actuator that pivots the flight control component 216 relative to the aircraft support surface 220 (e.g., see FIG. 2).

The electric motor 106, 206 transforms an input current to mechanical movement (e.g., rotary movement), which is applied to move the actuator 110, 210. A controller 104, 204 is electrically coupled to the electric motor 106, 206 to manage the operation of the electric motor 106, 206. The controller 104, 204 controls the amount of current input to the electric motor 106, 206. Accordingly, the controller 104, 204 indirectly controls the amount of force applied by the actuator 110, 210.

In certain examples, a gear box 108, 208 may be disposed between the electric motor 106, 206 and the actuator 110, 210 to provide torque multiplication between the electric motor 106, 206 and the actuator 110, 210. Certain actuator systems 100, 200 may include a no-back device for preventing load from being transferred along the actuator 110, 210 from a component (e.g., a flight control component 116, 216) driven by the actuator system 100, 200 back to the electric motor 106, 206.

In certain implementations, the controller 104, 204 can include one or more processors. The processors can interface with software, firmware and/or hardware. Additionally, the processors can include digital or analog processing capabilities and can interface with memory (e.g., random access memory, read-only memory, or other data storage). In certain examples, the processors can include a programmable logic controller, one or more microprocessors, or like structures.

In accordance with aspects of the disclosure, an overall efficiency of the actuator system 100, 200 can be monitored to determine the health of the actuator system 100, 200. In particular, a ratio between the output power of the actuator system 100, 200 and the input power of the actuator system 100, 200 is monitored over time. Degradation of the efficiency of the actuator system 100, 200 (as indicated by a reduction in the ratio) may be observed and corrective action taken before failure of the actuator system 100, 200.

In certain implementations, the input power and output power of the actuator system 100, 200 are each calculated from measurements taken at the input and output of the actuator system 100, 200. For example, various sensors can be disposed throughout the actuator system 100, 200 to obtain measurements used in the calculations. In certain examples, the one or more sensors are operationally coupled to the controller 104, 204 (e.g., to the processors of the controller 104, 204).

In certain examples, one or more of the sensors is integrated within the actuator system 100, 200. As used herein, a sensor being "integrated" means that the sensor is incorporated as part of the actuator system 100, 200 and is carried with and used within the actuator system 100, 200 while the system is deployed and used for its intended purpose in the field. An integrated sensor is capable of providing real time data after the actuator system 100, 200 has been installed and is being used.

In certain implementations, the input power of the actuator system 100, 200 is calculated based on the input current and voltage applied to the electric motor 106, 206. In certain examples, a voltage and current sensor arrangement 124, 224 is integrated within the actuator system 100, 200. The voltage and current sensor arrangement 124, 224 is configured to sense the input voltage and input current applied to the motor 106, 206. In some examples, the voltage and current sensor arrangement 124, 224 includes a voltage sensor and a separate current sensor that are both operationally coupled to the controller 104, 204. In other examples, the voltage and current sensor arrangement 124, 224 includes a single sensor that measures both voltage and current.

In certain implementations, the output power of the actuator system 100, 200 is calculated based on the force applied by the actuator 110, 210 and the output speed of the actuator 110, 210. In certain examples, a force sensor 114, 214 is integrated within the actuator system 100, 200 and is configured to measure the forces applied by the actuator 110, 210 (e.g., to the flight control component 116, 216 and aircraft support 120, 220). The force sensor 114, 214 may include any device used to measure mechanical load directly or indirectly through material displacement or other methods.

In certain examples, a speed sensor 122, 222 is integrated to provide information on the speed of a movable component (e.g., the actuator 110, 210) within the actuator system 100, 200. The speed sensor 122, 222 may include any device used to measure the speed of a component directly or indirectly. In some examples, the speed sensor 122 measures linear speed of a component. In other examples, the speed sensor 222 measures rotational speed of a component. In some examples, the speed sensor is applied to the flight control component 116, 216 and tracks the position of the flight control component 116, 216 over time. In other examples, the speed sensor 122, 222 is configured to sense the speed (i.e., the revolutions per minute) of the electric motor 106, 206. The output speed of the actuator 110, 210 may be determined by multiplying the measured speed of the electric motor 106, 206 by a known gear ratio.

Efficiency data may be gathered in real time and plotted. Correlations between overall actuator efficiency and actuator system failures may be observed. Real time data may be compared to historical data to determine whether the actuator health is acceptable. The comparison also may be used to predict when failure of the actuator system 100, 200 is expected to occur. Predicting actuator system failure allows for the actuator system 100, 200 to be serviced before such failure occurs. Pre-empting failure of the primary actuator systems in an aircraft places less reliance on the secondary actuator systems within the redundant system.

Based on historical observations of actuator efficiency and failure, a reference base-line efficiency value may be stored within the controller 104, 204. When the calculated efficiency of the actuator 110, 210 falls below this reference base-line efficiency value, the controller 104, 204 may generate an alert to the operator so that the actuator 110, 210 may be serviced upon landing. Suitable alerts include visual indicators (e.g., lights), auditory indicators (e.g., audible alarms), notations in system reports, alert messages (e.g., emails, texts, or other such transmissions), and the like. The base-line value may also be factory-set into the controller 104, 204.

In certain implementations, as the efficiency of the system 100, 200 decreases, it may be necessary to apply more input power to the electric motor 106, 206 to ensure that the output power remains at an acceptable level and is capable of supporting a minimum operating load. To increase the input power, the controller 104, 204 may apply a higher current to the electric motor 106, 206.

By integrating a force sensor 114, 214 into the actuator system 100, 200, input current (and hence input power) to the motor 106, 206 may be regulated by the controller 104, 204 to ensure that the output power levels of the actuator system 100, 200 do not exceed a maximum operating load (or a tolerance surrounding this operation load). The controller 104, 204 also may ensure that the output power levels of the actuator system 100, 200 do not drop below a required minimum operating load (or a tolerance surrounding this operating load). Inhibiting the actuator system 100, 200 from operating outside the minimum and maximum operating loads or other predetermined thresholds may reduce the need to overbuild the flight control components (or other surrounding structure). Accordingly, the components can be manufactured less robustly, leading to decreases in weight and/or expense of the component.

Turning now to FIG. 1, a linear actuator system 100 configured in accordance with the principles of the present disclosure is shown. The linear actuator 110 of the system 100 includes a screw drivetrain 102 (e.g., a ballscrew, a leadscrew, a rollerscrew, etc.). Rotation of the screw drivetrain 102 may increase or decrease the length of the linear actuator 110 so that the flight control component 116 may be moved with respect to the aircraft support surface 120.

A gear box 108 is operationally coupled between the electric motor 106 and the linear actuator 110. The gear box 108 may contain a gear train that is coupled to the screw drivetrain 102 and transmits torque from the motor 106 to rotate the screw drivetrain 102. As the electric motor 106 provides power to turn the gear train within the gear box 108 and hence to the screw drivetrain 102, the linear actuator 110 transmits the power from the electric motor 106 to drive the flight control component 116 in a predetermined direction.

In this example, the force sensor 114 is disposed adjacent to the aircraft support connection 112b between the linear actuator 110 and the aircraft support surface 120. However, the force sensor 114 may be placed anywhere within the actuator system 100, such as at the connection 112a between the actuator 110 and the flight control component 116. In certain examples, the force sensor 114 may consist of transducers, optical sensors, shear pins with integrated sensors, or some other load sensing device.

In this example, the speed sensor 122 and the voltage and current sensor arrangement 124 are disposed at the electric motor 106. In certain examples, the speed sensor 122 may include a Hall Effect sensor or one or more position sensors that are used to measure a time between a component reaching different positions.

Figure 2:
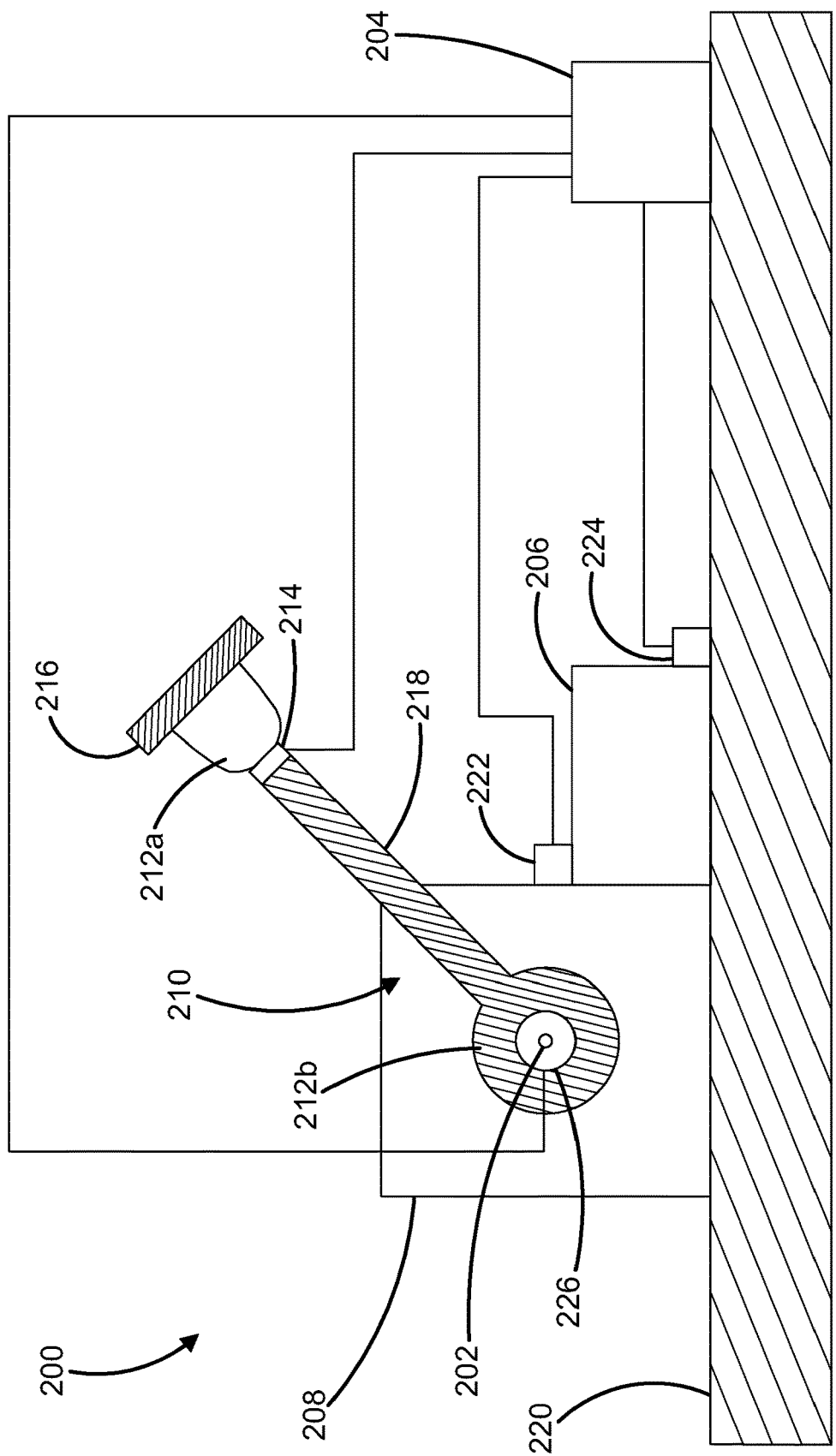
FIG. 2 is a schematic diagram of an example rotary actuator system in accordance with the principles of the present disclosure.

FIG. 2 illustrates another actuator system 200 configured in accordance with the principles of the present disclosure. In FIG. 2, the linear actuator 110 has been replaced with a rotary actuator 210. The rotary actuator system 200 includes a rotary shaft 202 coupled with a connection arm 218 to a flight control component 216 so that the flight control component 216 may be moved with respect to the aircraft support surface 220.

A gear box 208 is operationally coupled between the electric motor 206 and the rotary actuator 210. The gear box 208 may contain a gear train that is coupled to the rotary shaft 202 and transmits a torque from the motor 206 to rotate the rotary shaft 202. As the electric motor 206 provides power to turn the gear train within the gearbox 208 and hence the rotary shaft 202, the rotary actuator 210 transmits the power from the electric motor 206 to drive the flight control component 216 in a predetermined direction.

In certain implementations, output power of the rotary actuator 210 may be determined by multiplying the output torque by the angular speed of the rotary shaft 202. In certain examples, output torque applied by the rotary actuator 210 may be measured with the force sensor 214 disposed at or integrated on the connection arm 218. The force sensor 214 is configured to detect forces applied perpendicular to the connection arm 218 at a predetermined length from the rotary shaft 202. In this example, the torque could be determined by multiplying the detected force and the distance at which the force sensor 214 is positioned from the rotary shaft 202. Alternatively, or in addition to the force sensor 214, a torque sensor 226 may be integrated at the rotary shaft 202 and configured to measure the torque applied directly. The torque sensor 226 may include any device used to measure mechanical torque directly or indirectly though material displacement or other methods. In certain examples, the torque sensor 226 may consist of transducers, strain gauges, SAW devices, or torque meters.

In certain examples, a speed sensor 222 is configured to sense the rotation speed (e.g., in RPMs) of the electric motor 206. In such examples, the output angular speed of the rotary actuator 210 may be determined by multiplying the measured motor speed by a known gear ratio. The speed sensor 222 may include any device used to measure the speed of a component directly or indirectly. In certain examples, a speed sensor may include a Hall Effect sensor or one or more position sensors used to measure a time between a component reaching different positions.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. An actuator system comprising:
   an electric motor;
   an actuator coupled to the electric motor;
   a force sensor integrated with the actuator system for sensing a force transmitted through the actuator; and
   a controller for controlling operation of the electric motor, the controller interfacing with the force sensor and being configured to use force data from the force sensor to determine an overall efficiency value for the actuator system measured over time;
   wherein the controller is adapted to vary an input current provided to the electric motor based on the force data obtained from the force sensor to dynamically control an output force of the actuator; wherein the input current is adjusted based on decrease in the overall efficiency value.

2. The actuator system of claim 1, wherein the controller is configured to compare the overall efficiency value to a reference efficiency value to determine a health of the actuator system.

3. The actuator system of claim 2, wherein the reference efficiency value is a factory-set value saved in memory, or a base-line value based on previously determined overall efficiency values of the actuator system.

4. The actuator system of claim 2, wherein the controller is configured to generate an alert if the overall efficiency value deviates from the reference efficiency by a predetermined amount.

5. The actuator system of claim 1, wherein the controller is configured to determine the efficiency value based on a calculated output power of the actuator in view of a calculated input power provided to the electric motor.

6. The actuator system of claim 5, wherein the controller is configured to calculate the output power of the actuator based on the force data obtained from the force sensor and an output speed of the actuator.

7. The actuator system of claim 6, further comprising a motor speed sensor operationally coupled to the controller; wherein the controller is configured to determine the output speed of the actuator based on a speed of the electric motor measured by the motor speed sensor.

8. The actuator system of claim 6, further comprising a position sensor for sensing a position of the actuator operationally coupled to the controller; wherein the controller is configured to determine the output speed of the actuator based on data from the position sensor.

9. The actuator system of claim 5, wherein the controller is configured to calculate the input power provided to the electric motor based on an input current and an input voltage of the electric motor.

10. The actuator system of claim 9, further comprising a current and voltage sensor arrangement operationally coupled to the controller.

11. The actuator system of claim 1, wherein the actuator system includes a gear box for transferring torque from the electric motor to the actuator.

12. The actuator system of claim 1, wherein the actuator includes a linear actuator.

13. The actuator system of claim 1, wherein the actuator includes a rotary actuator.

14. The actuator system of claim 1, wherein the controller is adapted to vary the input current based on the force data from the force sensor and the overall efficiency value to ensure a minimum operating load is achieved by the actuator.

15. The actuator system of claim 1, wherein the controller is adapted to vary the input current based on the force data from the force sensor and the overall efficiency value to ensure a predetermined maximum operating load is not exceeded by the actuator.

16. The actuator system of claim 1, wherein the actuator system is installed on an aircraft and functions to drive primary or secondary flight control components of the aircraft.

17. The actuator system of claim 1, wherein the actuator system includes a no-back device for preventing load from being transferred from a component driven by the actuator system back to the electric motor.

18. A method for monitoring the real-time health of an actuator system installed to move primary or secondary flight control components of an aircraft, the method comprising:
inputting a current to an electric motor to drive a geartrain of a gearbox, the gearbox positioned between an actuator and the motor, the gearbox providing torque multiplication between the electric motor and the actuator, the actuator connected by connection members to a flight control component and the connection members connecting the actuator to an aircraft support surface;
transmitting torque through the gear box to drive the actuator to move a flight control component relative to an aircraft support surface;
sensing a force transmitted through the actuator system during operation of the actuator system;
determining an overall operating efficiency value of the actuator system using historical sensed force data measured over time;
comparing the overall operating efficiency value with a reference efficiency value;
varying an input current provided to the electric motor based on the overall operating efficiency value to dynamically control an output force of the actuator system; and
generating an alert if the overall operating efficiency value deviates from the reference efficiency value by a predetermined amount.

19. The method of claim 18, further comprising:
determining whether the sensed force is between a minimum operating load and a maximum operating load;
when the sensed force drops below the minimum operating load, calculating an increased input power value to be applied to the electric motor of the actuator system based on the overall operating efficiency value, and applying the increased input power value to the electric motor; and
when the sensed force exceeds the maximum operating load, calculating a decreased input power value to be applied to an electric motor of the actuator system based on the overall operating efficiency value, and applying the decreased input power value to the electric motor.

20. An actuator system comprising:
an electric motor;
an actuator coupled to the electric motor, the actuator connected by connection members to a flight control component and the connection members connecting the actuator to an aircraft support surface, the actuator actuating the flight control component relative to an aircraft support surface;
a gearbox coupled between the actuator and electric motor to provide torque multiplication between the electric motor and the actuator;
a force sensor integrated with the actuator system between the actuator and the flight control component for sensing a force transmitted through the actuator;
a speed sensor coupled to the electric motor to determine a rotational speed of the motor, and a controller for controlling operation of the electric motor, the controller interfacing with the force sensor and being configured to use force data from the force sensor to determine an overall efficiency value for the actuator system;
wherein the controller is adapted to vary an input current provided to the electric motor based on the force data obtained from the force sensor to dynamically control an output force of the actuator; wherein the input current is adjusted based on a decrease in the overall efficiency value.

* * * * *